US008120676B2

(12) United States Patent
Murata

(10) Patent No.: US 8,120,676 B2
(45) Date of Patent: Feb. 21, 2012

(54) IMAGE DISTORTION CORRECTING METHOD, CARRIER MEDIUM CARRYING DISTORTION CORRECTING PROGRAM, AND OPTICAL APPARATUS

(75) Inventor: Tsukasa Murata, Yamato (JP)

(73) Assignee: Nikon Corporation, Tokyo (JP)

( * ) Notice: Subject to any disclaimer, the term of this patent is extended or adjusted under 35 U.S.C. 154(b) by 743 days.

(21) Appl. No.: 12/285,102

(22) Filed: Sep. 29, 2008

(65) Prior Publication Data

US 2010/0177219 A1 Jul. 15, 2010

Related U.S. Application Data

(63) Continuation of application No. PCT/JP2007/000388, filed on Apr. 11, 2007.

(30) Foreign Application Priority Data

Apr. 14, 2006 (JP) .................................. 2006-112454

(51) Int. Cl.
*H04N 5/217* (2011.01)
(52) U.S. Cl. ........................................ 348/241; 348/335
(58) Field of Classification Search .................. 348/241, 348/335; 382/167, 275
See application file for complete search history.

(56) References Cited

U.S. PATENT DOCUMENTS

| 6,081,374 | A | * | 6/2000 | Abe et al. ........................ 359/431 |
| 6,476,869 | B1 | * | 11/2002 | Sekine et al. .................. 348/335 |
| 6,747,757 | B1 | | 6/2004 | Enomoto |
| 2005/0053307 | A1 | | 3/2005 | Nose et al. |
| 2005/0280877 | A1 | | 12/2005 | Watanabe |
| 2011/0157449 | A1 | * | 6/2011 | Chen et al. ..................... 348/335 |

FOREIGN PATENT DOCUMENTS

| JP | A-11-331543 | 11/1999 |
| JP | A-2002-359771 | 12/2002 |
| JP | A-2003-110847 | 4/2003 |
| JP | A-2004-199350 | 7/2004 |
| JP | A-2005-057605 | 3/2005 |
| JP | A-2006-081145 | 3/2006 |

OTHER PUBLICATIONS

Takahashi, Yuto, "Lens Designing," *Tokai University Press*, pp. 124-127, Mar. 20, 1994 (with Partial Translation).

* cited by examiner

*Primary Examiner* — Tuan Ho
(74) *Attorney, Agent, or Firm* — Oliff & Berridge, PLC

(57) ABSTRACT

A proposition is to provide a distortion correcting method, a carrier medium carrying distortion correcting program and an optical apparatus which can perform reliable and good distortion correction while suppressing the quantity of information in distortion correcting information. The distortion correcting method includes a preparing operation which expresses distortion aberration of an optical system for shooting in a function of a lens position thereof, optimizes coefficients of the function so that residual aberrations in two or more lens positions are controlled appropriately respectively, and prepares, in advance, information of optimized coefficients thereof as distortion correcting information of the optical system, and a correcting operation which performs a correction of distortion of an image picked up by the optical system based on the lens position at shooting time and the distortion correcting information prepared.

34 Claims, 10 Drawing Sheets

[Fig. 1]
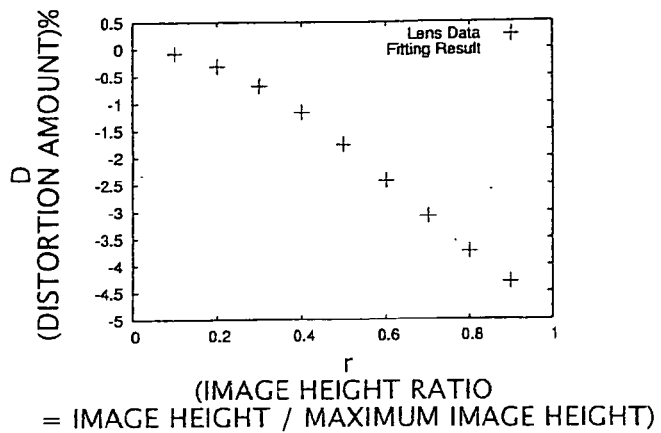
[Fig. 2A]
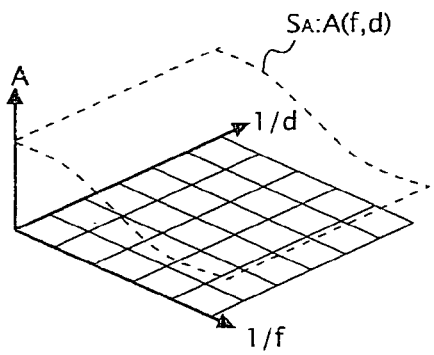
[Fig. 2B]
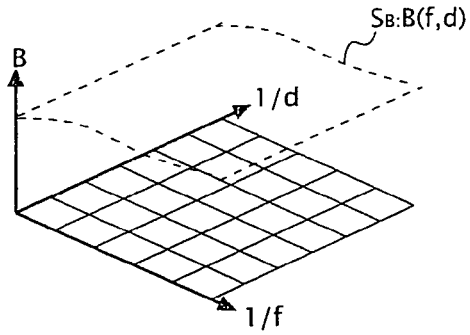
[Fig. 2C]
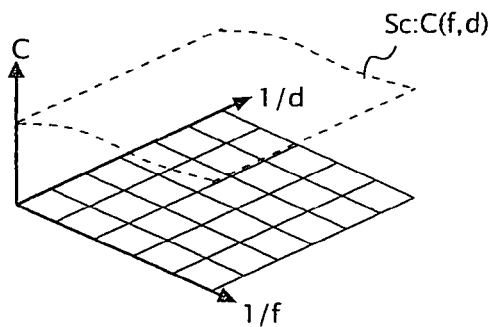

[Fig. 3]
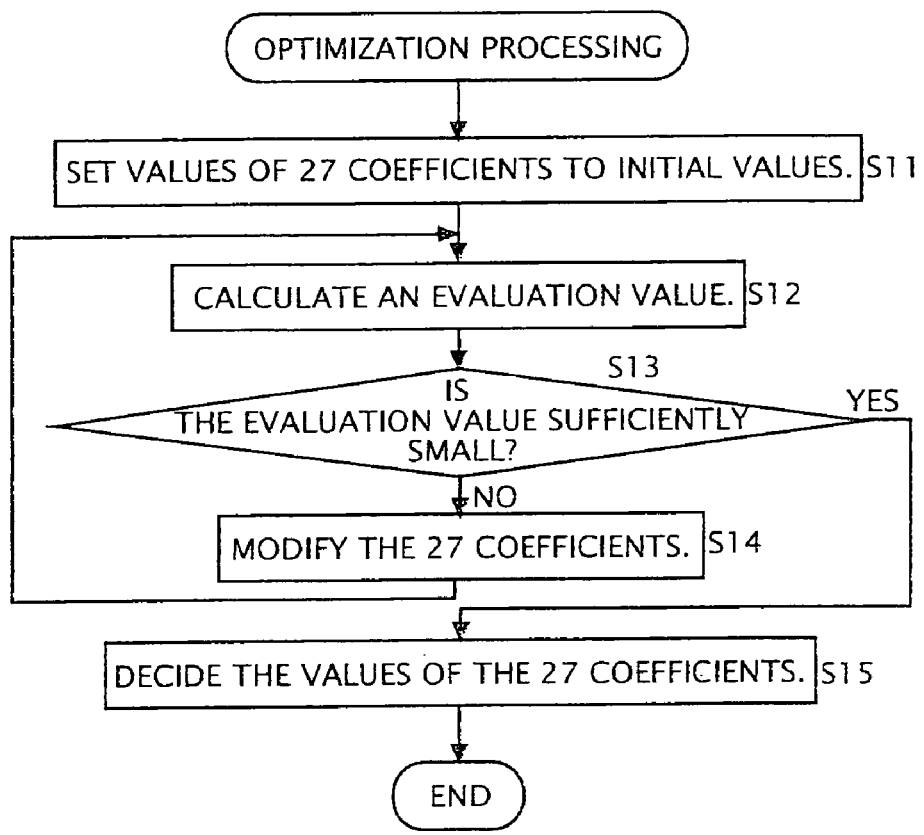

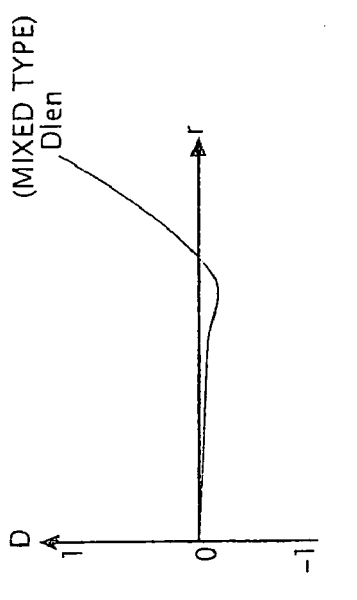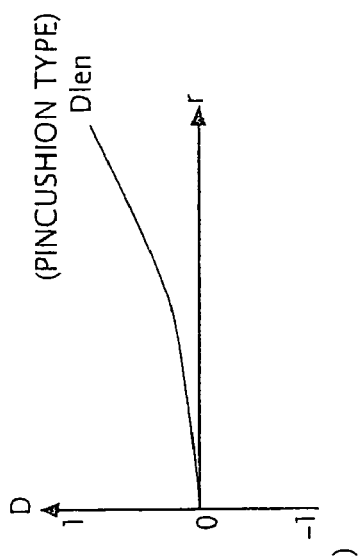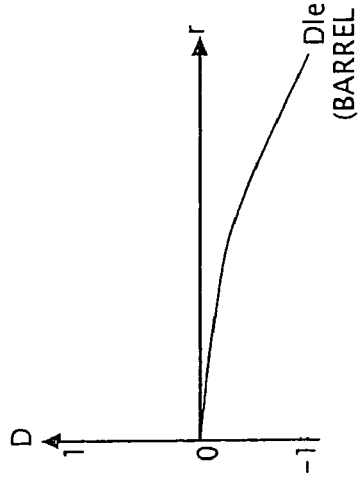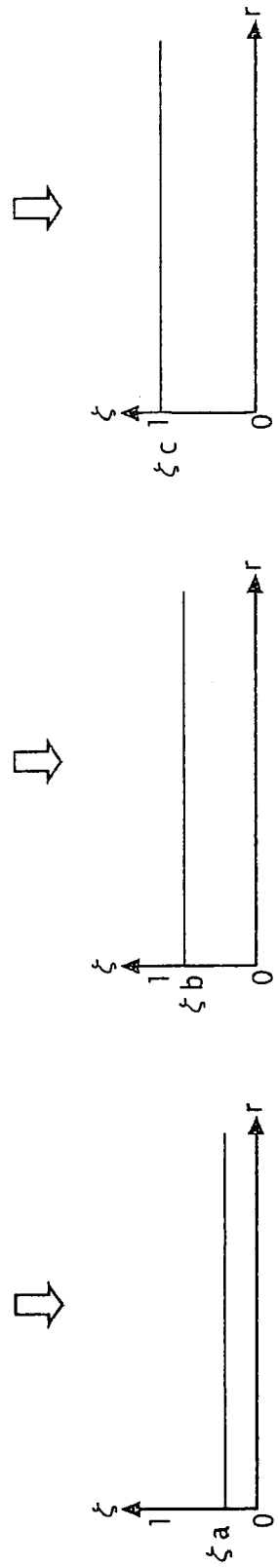

[Fig. 5]
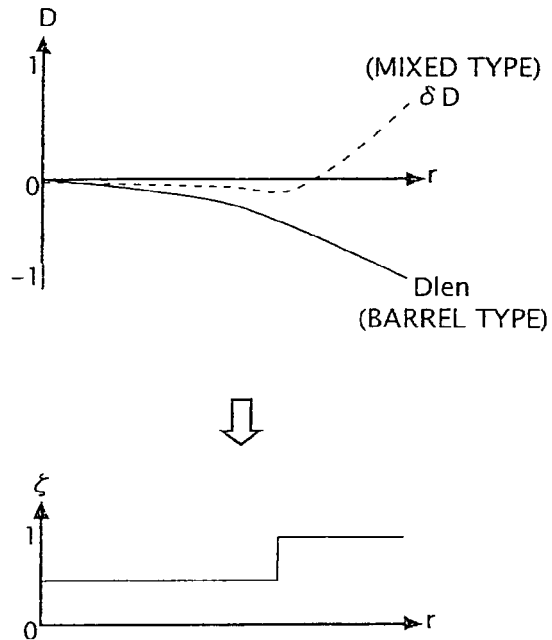
[Fig. 6]
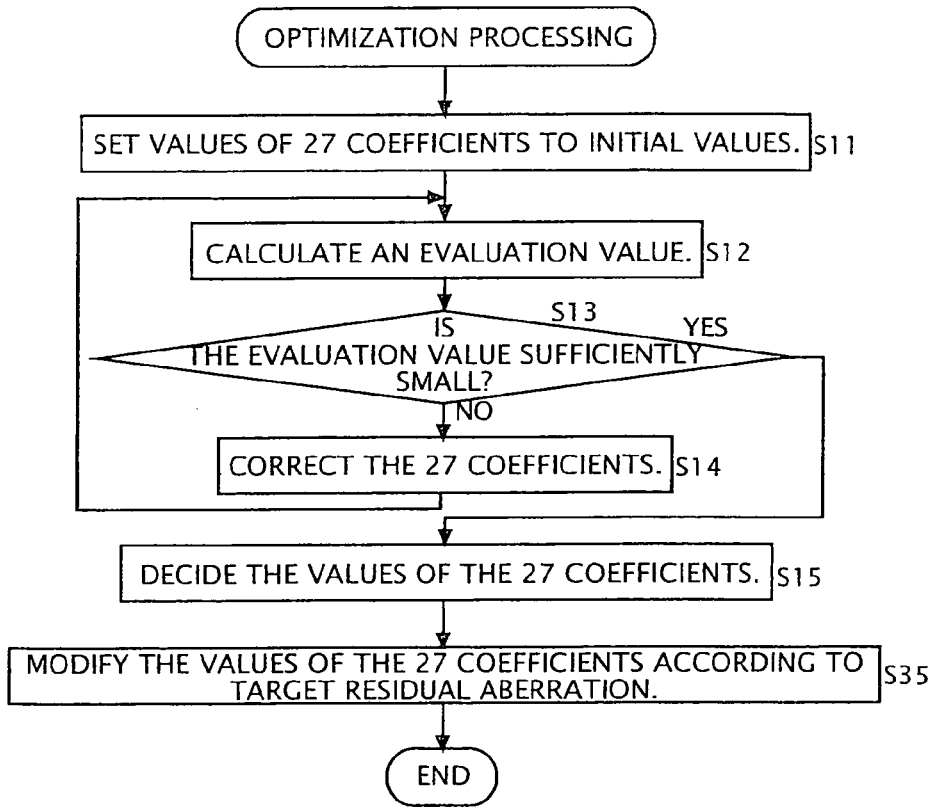

[Fig. 7]
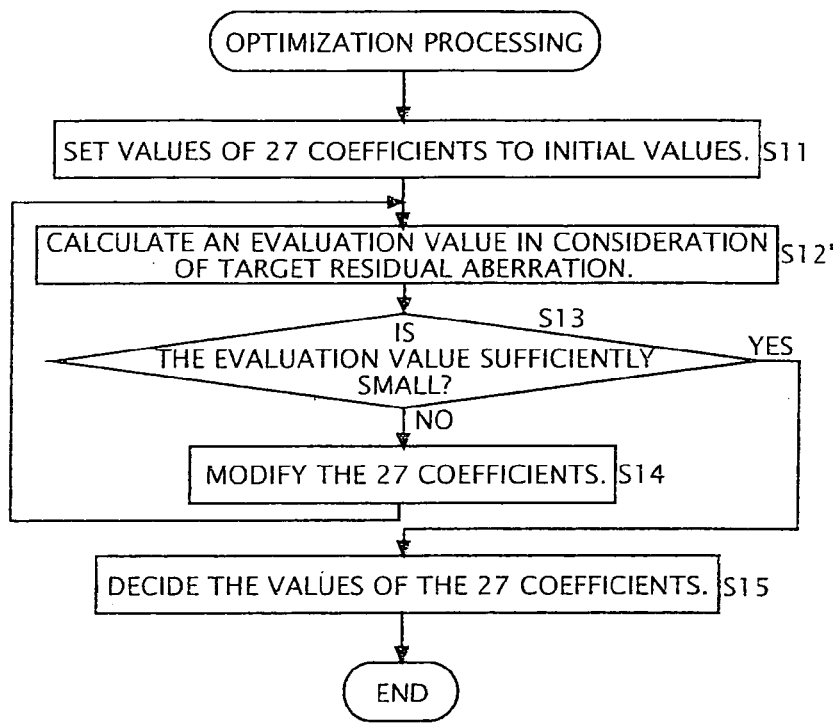
[Fig. 8]
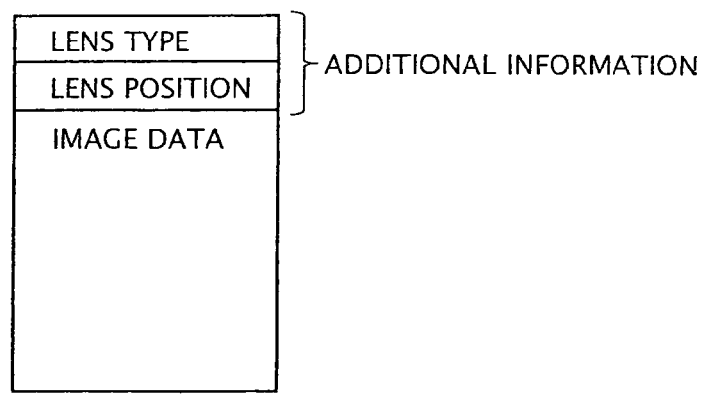

[Fig. 9]

DISTORTION CORRECTING INFORMATION

| LENS TYPE | CORRECTING INTENSITY | COEFFICIENTS |
|---|---|---|
| 1 | HIGH | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| 1 | MODERATE | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| 1 | LOW | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| 2 | HIGH | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| 2 | MODERATE | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| 2 | LOW | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| ... | ... | |

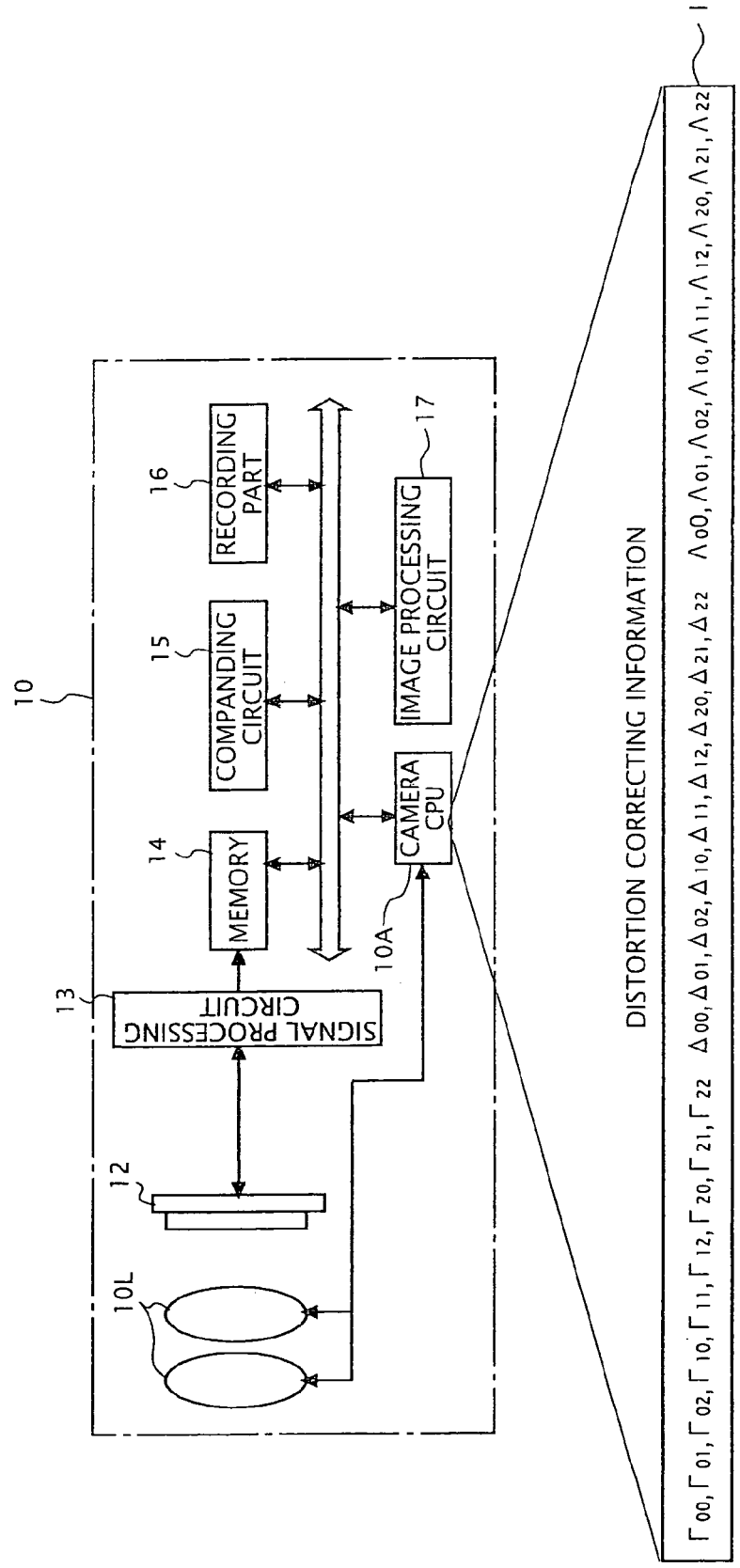

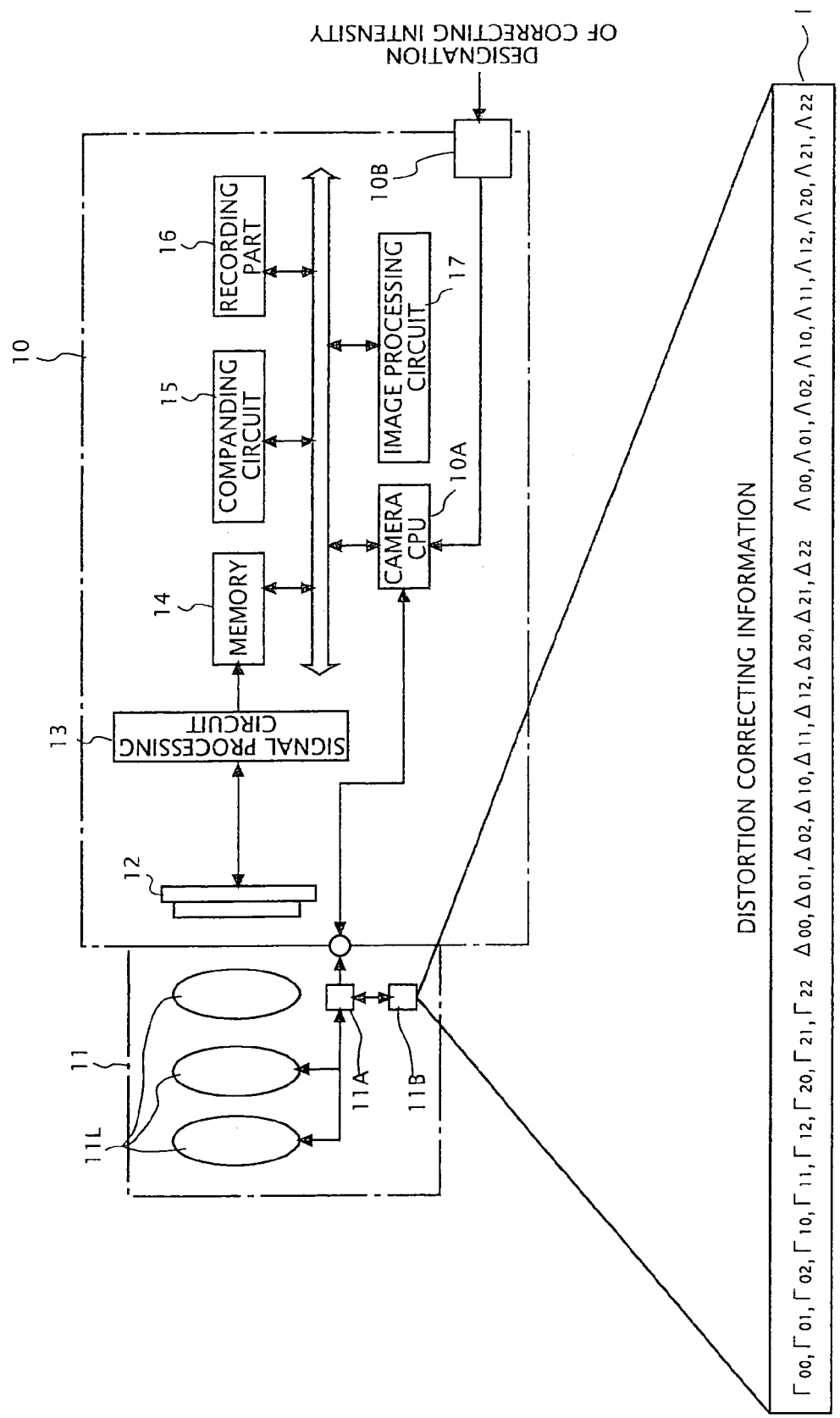

[Fig. 12]
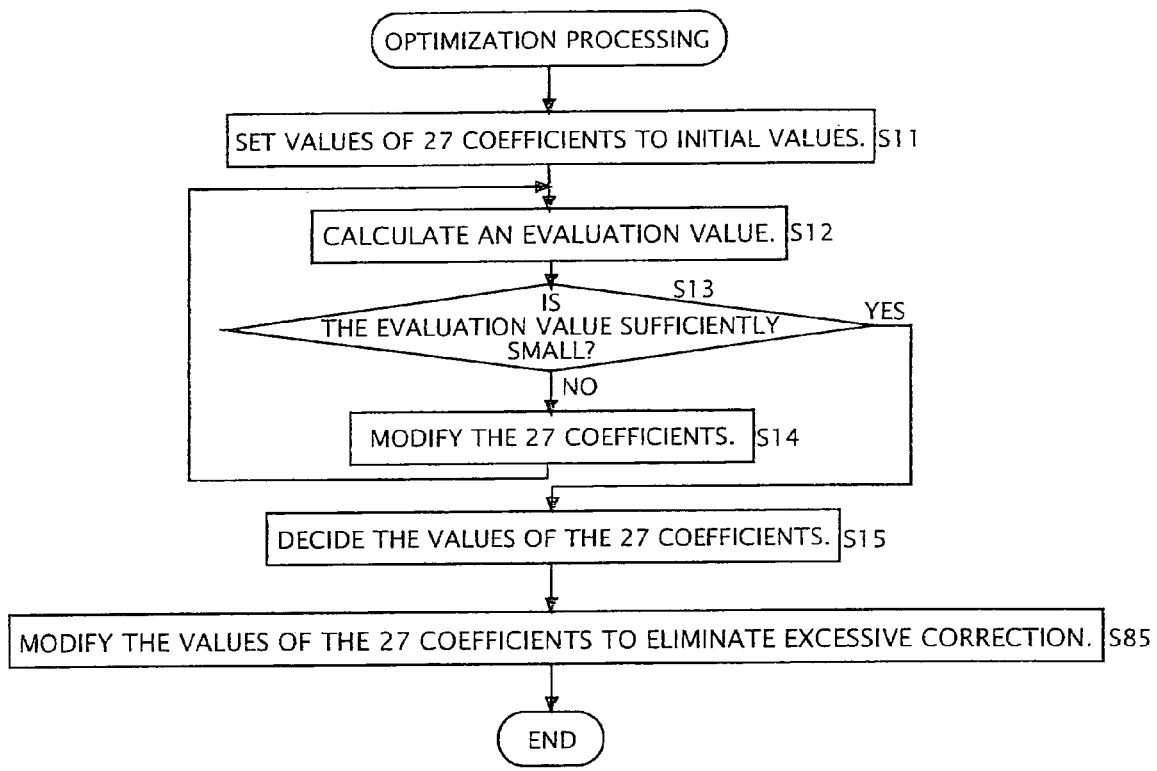

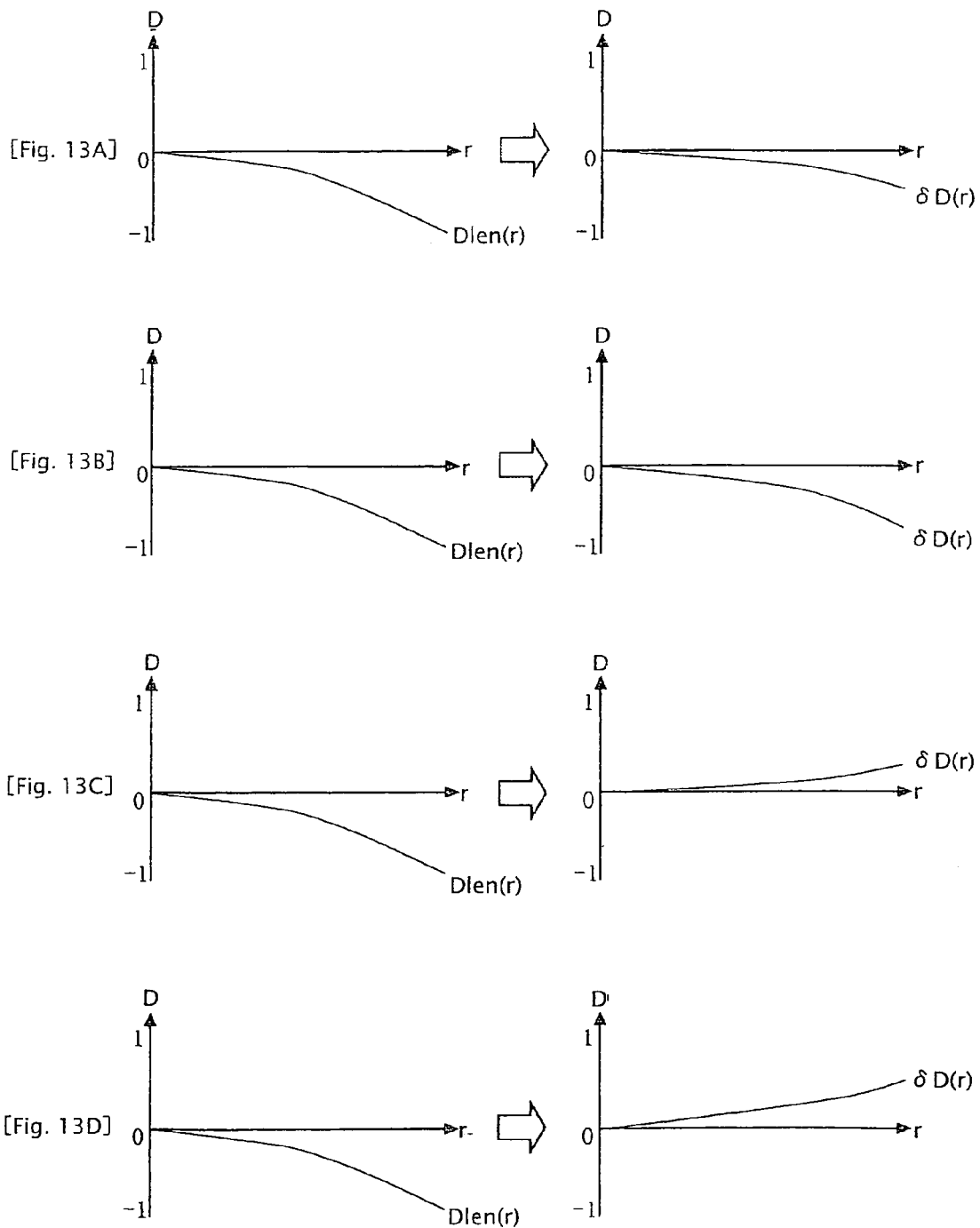

IMAGE DISTORTION CORRECTING METHOD, CARRIER MEDIUM CARRYING DISTORTION CORRECTING PROGRAM, AND OPTICAL APPARATUS

CROSS-REFERENCE TO RELATED APPLICATION

This application is a Continuation Application of International Application No. PCT/JP2007/000388, filed Apr. 11, 2007, designating the U.S., in which the International Application claims a priority date of Apr. 14, 2006, based on prior filed Japanese Patent Application No. 2006-112454, the entire contents of which are incorporated herein by reference.

BACKGROUND

1. Field

The present application relates to a distortion correcting method and a carrier medium carrying distortion correcting program applied to an electronic camera, image processing software, etc. In addition, the present application relates to an optical apparatus provided with an optical system for shooting such as an electronic camera, an interchangeable lens, a camera system, etc.

2. Description of the Related Art

There is known an image processing technique for correcting distortion of an image picked up by an electronic camera (see the following Patent Documents 1 and 2, Non-Patent Document 1, etc.). In the distortion correction, it is necessary that a distortion amount distribution on the image is already known.

When $Y_0$ is the image height at an ideal image point, and $Y$ is the image height at an actual image point, the distortion amount D which a lens for shooting gives to the image is represented by the following expression.

$$D=100\times(Y-Y_0)/Y_0[\%]$$

The distribution of the distortion amount D on the image can be approximated to a function of image height ratio $r$ (=image height/maximum image height) as follows.

$$D(r)=a_1 r+a_2 r^2+a_3 r^3+a_4 r^4+a_5 r^5+a_6 r^6+\ldots$$

It is generally conceived that sufficient good approximation can be obtained even if the number of terms in this function is reduced to 3 in terms of the order of this function as follows.

$$D(r)=a_1 r+a_2 r^2+a_3 r^3$$

Incidentally, coefficients $a_1$, $a_2$ and $a_3$ in this function vary depending not only on the type (specification) of the lens but also on the lens position (combination of the focal length f and the focal position d) at the shooting time.

In the camera described in Patent Document 1, therefore, a table containing coefficients $a_1$, $a_2$ and $a_3$ for each lens position is provided as distortion correcting information in advance. If the camera refers to this table in accordance with the lens position at the shooting time, the distortion amount distribution on the image can be calculated easily.

On the other hand, Patent Document 2 has disclosed a printer which makes an operator set correction characteristic for distortion correction while displaying an image on a monitor and which executes distortion correction under the setting. According to this printer, the operator can perform desired distortion correction on each image.

Patent Document 1: Japanese Unexamined Patent Application Publication No. 2003-110847

Patent Document 2: Japanese Unexamined Patent Application Publication No. H11-331543

Non-Patent Document 1: Yuto Takahashi, "Lens Designing", Tokai University Press, p 127, Mar. 20, 1994

In the camera described in Patent Document 1, there is however a possibility that a bad corrected result may be caused by lowering of distortion correction accuracy because accuracy in calculation of the distortion amount distribution on an image picked up at a certain lens position is worsened. To prevent this, the quantity of information in the table must be increased.

On the other hand, in the printer described in Patent Document 2, whether distortion correction is good or bad depends on the operator's sense. Moreover, even a skilled operator can hardly correct distortion perfectly when the distortion amount distribution on the image is complex (for example, when mixed-type distortion aberration occurs). (Here, the term "mixed-type" means a mixture of barrel and pincushion types.) In addition, the distortion correction takes a great deal of labor and time.

SUMMARY

A proposition is to provide a distortion correcting method, a carrier medium carrying a distortion correcting program and an optical apparatus which can perform reliable and good distortion correction while suppressing the quantity of information in distortion correcting information.

The distortion correcting method is including a preparing operation which expresses distortion aberration of an optical system for shooting in a function of a lens position thereof, optimizes the coefficients so that residual aberrations in two or more lens positions are controlled appropriately respectively, and prepares, in advance, information of optimized coefficients thereof as distortion correcting information of the optical system, and a correcting operation which performs a correction of distortion of an image picked up by the optical system based on the lens position at shooting time and the distortion correcting information prepared.

Incidentally, the optimization of the coefficients may perform control of a balance between amounts of the residual aberrations in the two or more lens positions.

In addition, the amounts of residual aberrations in the two or more lens positions may be set according to aberration types before the correction in the two or more lens positions.

In addition, the amounts of residual aberrations in the two or more lens positions may be set according to types of the residual aberrations in the two or more lens positions.

In addition, the amounts of residual aberrations in the two or more lens positions may be set for each of image heights in the two or more lens positions.

In addition, the preparing operation may modify the optimized coefficients so that the residual aberrations in the two or more lens positions are set to target residual aberrations.

In addition, the optimization of the coefficients may perform control so that the residual aberrations in the two or more lens positions approach target residual aberrations.

In addition, the target residual aberrations in the two or more lens positions may be set according to the aberrations before the correction in the two or more lens positions.

In addition, the target residual aberration in a lens position where the aberration type before the correction is a mixed-type may be set to be of a non-mixed-type.

In addition, the target residual aberration in a lens position where the aberration type before the correction is a barrel type may be set to be of a barrel type smaller in distortion amount than before the correction.

In addition, the target residual aberration in a lens position where the aberration type before the correction is a pincushion type may be set to be of a barrel type smaller in distortion amount than before the correction or of a pincushion type smaller in distortion amount than before the correction.

In addition, the preparing operation may estimate the possibility that error will be contained in values of the lens position used for the distortion correction.

In addition, the preparing operation may modify the optimized coefficients so that the correction can be prevented from excessive correction even when error is contained in values of the lens position used for the distortion correction.

On the other hand, the carrier medium carrying the distortion correcting program stores a distortion correcting program causing a computer to execute a preparing operation which expresses distortion aberration of an optical system for shooting in a function of a lens position thereof, optimizes coefficients of the function so that residual aberrations in two or more lens positions are controlled appropriately respectively, and prepares, in advance, information of optimized coefficients thereof as distortion correcting information of the optical system, and a correcting operation which performs a correction of distortion of an image picked up by the optical system based on the lens position at shooting time and the distortion correcting information prepared.

Incidentally, the coefficients may be optimized in advance so that the amounts of residual aberrations in the two or more lens positions depend on aberration types before the correction in the two or more lens positions.

In addition, the coefficients may be optimized in advance so that the amounts of residual aberrations in the two or more lens positions depend on residual aberration types in the two or more lens positions.

In addition, the coefficients may be optimized in advance so that the amounts of residual aberrations in the two or more lens positions depend on image heights in the two or more lens positions.

In addition, the coefficients may be optimized in advance so that the residual aberrations in the two or more lens positions approach target residual aberrations.

In addition, the target residual aberrations in the two or more lens positions may depend on aberrations before the correction in the two or more lens positions.

In addition, the target residual aberration in a lens position where the aberration type before the correction is a mixed-type may be of a non-mixed-type.

In addition, the target residual aberration in a lens position where the aberration type before the correction is a barrel type may be of a barrel type smaller in distortion amount than before the correction.

In addition, the target residual aberration in a lens position where the aberration type before the correction is a pincushion type may be of a barrel type smaller in distortion amount than before the correction or of a pincushion type smaller in distortion amount than before the correction.

In addition, the coefficients may be optimized in advance so that the correction can be prevented from excessive correction even when error is contained in values of the lens position used for the distortion correction.

On the other hand, the optical apparatus is equipped with an optical system for shooting and stores in advance, information of coefficients when distortion aberration of the optical system is expressed in a function of lens position of the optical system as distortion correcting information to be used when a correction of distortion of an image picked up by the optical system will be performed, the information of coefficients being optimized in advance so that balance between amounts of residual aberrations in two or more lens positions is controlled.

Incidentally, the coefficients may be optimized in advance so that the amounts of residual aberrations in the two or more lens positions depend on aberration types before the correction in the two or more lens positions.

In addition, the coefficients may be optimized in advance so that the amounts of residual aberrations in the two or more lens positions depend on residual aberration types in the two or more lens positions.

In addition, the coefficients may be optimized in advance so that the amounts of residual aberrations in the two or more lens positions depend on image heights in the two or more lens positions.

In addition, the coefficients may be optimized in advance so that the residual aberrations in the two or more lens positions approach target residual aberrations.

In addition, the target residual aberrations in the two or more lens positions may depend on aberrations before the correction in the two or more lens positions.

In addition, the target residual aberration in a lens position where the aberration type before the correction is a mixed-type may be of a non-mixed-type.

In addition, the target residual aberration in a lens position where the aberration type before the correction is a barrel type may be of a barrel type smaller in distortion amount than before the correction.

In addition, the target residual aberration in a lens position where the aberration type before the correction is a pincushion type may be of a barrel type smaller in distortion amount than before the correction or of a pincushion type smaller in distortion amount than before the correction.

In addition, the coefficients may be optimized in advance so that the correction can be prevented from excessive correction even when error is contained in values of the lens position used together with the coefficients for the distortion correction.

In addition, any optical apparatus is including an interchangeable lens which has the optical system for shooting and in which the distortion correcting information is stored in advance, and a camera which can be coupled to the interchangeable lens and which can read the distortion correcting information stored in advance in the interchangeable lens (this optical apparatus corresponds to a camera system).

There can be achieved a distortion correcting method, a distortion correcting program and an optical apparatus which can perform sure and good distortion correction while suppressing the quantity of information in distortion correcting information.

BRIEF DESCRIPTION OF THE DRAWINGS

FIG. 1 is a view for distortion aberration data in a certain lens position of a certain lens.

FIGS. 2A to 2C are graphs showing states of distribution of coefficients A, B and C in directions $d^{-i}$ and $f^{-i}$.

FIG. 3 is a flow chart for simplified explanation of optimization processing in a first embodiment.

FIGS. 4A to 4C are graphs showing the definition of an expression (5).

FIG. 5 are graphs when weighting coefficient $\zeta$ depends on r.

FIG. 6 is a flow chart of optimization processing in a third embodiment.

FIG. 7 is a flow chart of optimization processing in a fourth embodiment.

FIG. 8 is a view for explaining additional information of image data.

FIG. 9 is a view for explaining contents of a table stored in a computer.

FIG. 10 is a configuration diagram of a camera in a sixth embodiment.

FIG. 11 is a configuration diagram of a camera system in a seventh embodiment.

FIG. 12 is a flow chart of optimization processing in an eighth embodiment.

FIGS. 13A to 13D are graphs for explaining optimization processing in the eighth embodiment.

DETAILED DESCRIPTION OF THE EMBODIMENTS

First Embodiment

A first embodiment will be described below. This embodiment is an embodiment of a method of preparing distortion correcting information. Since the distortion correcting information is necessary for distortion correction of software, an electronic camera etc. and unique to the type (specification) of a lens for shooting, the distortion correcting information is prepared by a manufacture of the lens.

FIG. 1 shows distortion aberration data in a certain lens position of a certain lens. In FIG. 1, the horizontal axis shows image height ratio r, and the vertical axis shows distortion amount D. The present inventor has thought that the distortion amount D can be well approximated to a function (1) of the image height ratio r (in which A, B and C are coefficients).

$$D(r) \equiv Ar^4 + Br^3 + Cr^2 \quad (1)$$

The coefficients A, B and C in this function (1) vary depending on the lens position of the lens (combination of focal position d and focal length f). A distribution of the coefficient A in directions $d^{-i}$ and $f^{-i}$, a distribution of the coefficient B in directions $d^{-i}$ and $f^{-i}$ and a distribution of the coefficient C in directions $d^{-i}$ and $f^{-i}$ can be expressed in smooth curved surfaces $S_A$, $S_B$ and $S_C$ as represented by broken lines in FIGS. 2A, 2B and 2C respectively. (However, the shapes of curves shown in FIG. 2 are only an example and real shapes need not be the same as these shapes.)

In this embodiment, it is therefore assumed that the coefficients A, B and C are expressed in functions (A), (B) and (C) of $d^{-i}$ and $f^{-i}$.

$$A(f, d) \equiv \sum_{i=0}^{2} \sum_{j=0}^{2} \Gamma_{ij} d^{-i} f^{-j} \quad (A)$$

$$B(f, d) \equiv \sum_{i=0}^{2} \sum_{j=0}^{2} \Delta_{ij} d^{-i} f^{-j} \quad (B)$$

$$C(f, d) \equiv \sum_{i=0}^{2} \sum_{j=0}^{2} \Lambda_{ij} d^{-i} f^{-j} \quad (C)$$

These functions (A), (B) and (C) will be hereinafter referred to as "coefficient functions" and the aforementioned function (1) will be hereinafter referred to as "distortion amount function".

The coefficient function (A) includes nine terms different in combination of order of d and order of f and includes nine coefficients $\Gamma_{00}, \Gamma_{01}, \Gamma_{02}, \Gamma_{10}, \Gamma_{11}, \Gamma_{12}, \Gamma_{20}, \Gamma_{21}$ and $\Gamma_{22}$.

The coefficient function (B) includes nine terms different in combination of order of d and order of f and includes nine coefficients $\Delta_{00}, \Delta_{01}, \Delta_{02}, \Delta_{10}, \Delta_{11}, \Delta_{12}, \Delta_{20}, \Delta_{21}$ and $\Delta_{22}$.

The coefficient function (C) includes nine terms different in combination of order of d and order of f and includes nine coefficients $\Lambda_{00}, \Lambda_{01}, \Lambda_{02}, \Lambda_{10}, \Lambda_{11}, \Lambda_{12}, \Lambda_{20}, \Lambda_{21}$ and $\Lambda_{22}$.

On this occasion, the distortion amount function (1) can be expressed in twenty-seven coefficients $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}, \Delta_{00}, \Delta_{01}, \Delta_{02}, \Delta_{10}, \Delta_{11}, \Delta_{12}, \Delta_{20}, \Delta_{21}, \Delta_{22}, \Lambda_{00}, \Lambda_{01}, \Lambda_{02}, \Lambda_{10}, \Lambda_{11}, \Lambda_{12}, \Lambda_{20}, \Lambda_{21}$ and $\Lambda_{22}$ as represented by the following expression (2).

$$D(f, d, r) \equiv \sum_{i=0}^{2} \sum_{j=0}^{2} \Gamma_{ij} d^{-i} f^{-j} r^4 + \sum_{i=0}^{2} \sum_{j=0}^{2} \Delta_{ij} d^{-i} f^{-j} r^3 + \sum_{i=0}^{2} \sum_{j=0}^{2} \Lambda_{ij} d^{-i} f^{-j} r^2 \quad (2)$$

Therefore, the manufacture in this embodiment prepares values of these 27 coefficients as distortion correcting information of the aforementioned lens.

Incidentally, for distortion correction of an image picked up by this lens, values of the 27 coefficients contained in the distortion correcting information are assigned to the distortion amount function (2) to thereby acquire a calculating expression, values of lens position (f, d) at the image shooting time are assigned to the calculating expression to thereby make the distortion amount distribution of the image known, and distortion correction is performed so that the distortion amount distribution becomes zero (i.e. the distortion amount distribution is used as correction characteristic).

The manufacture in this embodiment first prepares distortion aberration data of the aforementioned lens in respective lens positions (f, d). Although the distortion aberration data may be obtained by a simulation based on design data of the lens or may be measured data of the lens, it is desirable that the distortion aberration data be as detailed as possible. The manufacture optimizes values of the 27 coefficients by using the distortion aberration data. A computer is used for the optimization processing. Distortion aberration data are input into this computer by the manufacture in advance. An optimization processing program for execution of the following operation is installed in this computer.

FIG. 3 is a flow chart for simplified explanation of the optimization processing.

As shown in FIG. 3, in the optimization processing, the computer first sets the 27 coefficients as initial values (step S11). Subsequently, an evaluation value S for the coefficients is calculated (step S12). A combination of values of the 27 coefficients is corrected repeatedly little by little so that the evaluation value S is reduced (steps S13 and S14). When the evaluation value S then becomes sufficiently small (YES in step S13), the values of the 27 coefficients at this point of time are stored as distortion correcting information (step S15) and the optimization processing is terminated. Setting of the initial values (step S11) and calculation of the evaluation value S (step S12) will be described below in detail successively.

Setting of the initial values (step S11):

In this step, the computer first fits distortion aberration data in a certain lens position (f, d) to the aforementioned distortion amount function (1) (for example, by a least squares method) and acquires values of the coefficients A, B and C. The computer further performs such acquisition of values of the coefficients A, B and C on all lens positions (f, d).

Subsequently, the computer fits the values of the coefficient A in all lens positions (f, d) to the aforementioned coefficient function (A) and acquires values of the 9 coefficients Γ. The computer further fits the values of the coefficient B in all lens positions (f, d) to the coefficient function (B) and acquires values of the 9 coefficients Δ. The computer further fits the values of the coefficient C in all lens positions (f, d) to the coefficient function (C) and acquires values of the 9 coefficients Λ. The values of the 27 coefficients acquired thus are set as initial values.

Calculation of the evaluation value S (step S12):

In this step, the computer first acquires a calculating expression by assigning the values of the 27 coefficients to the distortion amount function (2) and calculates a distortion amount D(f, d, r) in a certain lens position (f, d) in accordance with the calculating expression. The distortion amount D(f, d, r) is hereinafter replaced with "calculated distortion amount $D_{exp}(f, d, r)$".

The computer refers to a real distortion amount D(f, d, r) in the lens position (f, d) from the distortion aberration data. The distortion amount D(f, d, r) is hereinafter replaced with "proper distortion amount $D_{len}(f, d, r)$".

The computer calculates a difference $\{D_{len}(f, d, r)-D_{exp}(f, d, r)\}$ between the calculated distortion amount $D_{exp}(f, d, r)$ and the proper distortion amount $D_{len}(f, d, r)$. The difference $\{D_{len}(f, d, r)-D_{exp}(f, d, r)\}$ is calculation error when the 27 coefficients and the lens position (f, d) are given. The difference $\{D_{len}(f, d, r)-D_{exp}(f, d, r)\}$ is a distortion amount distribution which remains on the images after distortion of the image picked up in the lens position (f, d) is corrected based on the 27 coefficients. Therefore, the difference $\{D_{len}(f, d, r)-D_{exp}(f, d, r)\}$ is hereinafter replaced with "residual aberration amount δD(f, d, r)".

The computer further performs such calculation of the residual aberration amount δD(f, d, r) on all lens positions. The computer calculates a total residual aberration amount in all lens positions as an evaluation value S for the 27 coefficients. The expression for calculation of the evaluation value S is as represented by the following expression (3) (the step S12 has been described).

$$S \equiv \sum_{all\text{-}position} \int dr |D_{len}(f, d, r) - D_{exp}(f, d, r)| = \sum_{all\text{-}position} \int dr |\delta D(f, d, r)| \quad (3)$$

That is, in the optimization processing in this embodiment, the 27 coefficients are first set to initial values (step S11), respectively. Incidentally, on this occasion, the initial values of the 9 coefficients Γ, the initial values of the 9 coefficients Δ and the initial values of the 9 coefficients Λ are calculated by means of independent fitting. For this reason, there is a possibility that the residual aberration amount δD(f, d, r) may be large in some parts of lens positions when the loop of the steps S12 to S14 is initiated.

However, the loop of the aforementioned steps S12 to S14 works toward reduction of the evaluation value S given by the expression (3). That is, the loop of the steps S12 to S14 works so that the residual aberration amount δD(f, d, r) in each lens position approaches zero. Accordingly, when the loop is repeated a sufficient number of times, the values of the 27 coefficients converge on such values that the residual aberration amounts δD(f, d, r) in the respective lens positions are suppressed equally. As a result, distortion correcting information (values of the 27 coefficients) good to all lens positions is prepared.

Accordingly, the distortion correcting information prepared in this embodiment is provided so that distortion correction can be performed reliably and well in each of all lens positions though the quantity of information in the distortion correcting information is small.

This embodiment has been described on the assumption that both focal length f and focal position d of the lens are variable. When the lens is a fixed focus lens, the aforementioned coefficients A, B and C are approximated to functions of only d because f is constant. On this occasion, the distortion correcting information includes 9 coefficients because the number of terms in each of the coefficient functions (A), (B) and (C) is 3.

Although this embodiment has been described on the assumption that the optimization processing is executed by a computer, part or all of this processing may be executed manually by the manufacture.

Second Embodiment

A second embodiment will be described below. This embodiment is a modification of the first embodiment. Only a point of difference between this embodiment and the first embodiment will be described below.

The point of difference is in that the following expression (4) is used in place of the aforementioned expression (3) as an expression for calculation of the evaluation value S.

$$S \equiv \sum_{all\text{-}position} \int dr \{\zeta(f, d, r) |\delta D(f, d, r)|\} \quad (4)$$

In the expression (4), ζ(f, d, r) is a weighting coefficient which is set for each lens position and for each image height ratio. In this embodiment, the weighting coefficient ζ(f, d, r) is regarded as a function of only each lens position (f, d) for the sake of simplification so that the function takes a constant value for the same lens position regardless of the image height ratio r. On this occasion, as the weighting coefficient ζ(f, d, r) in the lens position increases, the optimized residual aberration amount δD(f, d, r) decreases.

In this embodiment, therefore, the weighting coefficient ζ(f, d, r) is set to be large for a lens position requiring high correction accuracy and is set to be small for a lens position requiring no high correction accuracy. In this manner, correction accuracy in some parts of lens positions can be improved efficiently while the total residual aberration can be reduced to the same degree as in the first embodiment.

Here, the lens position requiring high correction accuracy is, for example, a lens position where the proper distortion amount $D_{len}(f, d, r)$ is of a mixed-type. This is because it is conceived that the mixed-type distortion amount distribution is highly likely to leave a feeling of strangeness in a corrected image compared with another type of distortion amount distribution even when distortion correction is performed in the same correction accuracy.

On the other hand, the lens position requiring no high correction accuracy is, for example, a lens position where the proper distortion amount $D_{len}(f, d, r)$ is of a barrel type. This is because it is generally conceived that the barrel type distortion amount distribution is not likely to leave a feeling of strangeness in a corrected image compared with another type of distortion amount distribution even when distortion correction is performed in the same correction accuracy.

In this embodiment, therefore, the weighting coefficient ζ in each lens position is defined as represented by the following expression (5) in accordance with the type of the proper distortion amount $D_{len}(f, d, r)$ in each lens position.

$$\begin{cases} \zeta(f, d, r) = \text{small} & \text{when } D_{len} \text{ is of a barrel type} \\ \zeta(f, d, r) = \text{moderate} & \text{when } D_{len} \text{ is of a pincushion type} \\ \zeta(f, d, r) = \text{large} & \text{when } D_{len} \text{ is of a mixed type} \end{cases} \quad (5)$$

The definition of the expression (5) can be graphed out as shown in FIG. 4. As shown in FIG. 4A, in a lens position where the proper distortion amount $D_{len}(f, d, r)$ is of a barrel type, the weighting coefficient $\zeta$ takes a small value $\zeta_a$ ($\zeta_a \ll 1$). As shown in FIG. 4B, in a lens position where the proper distortion amount $D_{len}(f, d, r)$ is of a pincushion type, the weighting coefficient $\zeta$ takes a slightly large value $\zeta_b$($\zeta_a < \zeta_b < 1$). As shown in FIG. 4C, in a lens position where the proper distortion amount $D_{len}(r)$ is of a mixed-type, the weighting coefficient $\zeta$ takes a large value $\zeta_c$($\zeta_b < \zeta_c < 1$).

According to the distortion correcting information (27 coefficients) prepared in this embodiment, distortion correction accuracy in each lens position can be controlled in accordance with the type of the distortion amount distribution in each lens position without the necessity of any ingenuity for calculation and correction of the distortion amount (except that distortion correction is performed based on the calculating expression formed by assignment of the values of the 27 coefficients into the distortion amount function (2)).

Specifically, distortion correction accuracy becomes high when the distortion amount distribution on an image before distortion correction is of a mixed-type, distortion correction accuracy becomes moderate when the distortion amount distribution on an image before distortion correction is of a pincushion type, and distortion correction accuracy becomes low when the distortion amount distribution on an image before distortion correction is of a barrel type.

Although this embodiment has been described on the assumption that the weighting coefficient $\zeta(f, d, r)$ in each lens position is defined in terms of the type of the proper distortion amount $D_{len}(f, d, r)$ in each lens position, the weighting coefficient $\zeta(f, d, r)$ in each lens position may be defined in terms of the proper distortion amount $D_{len}(f, d, r)$ or may be defined in terms of combination of the proper distortion amount $D_{len}(f, d, r)$ and its type.

Although this embodiment has been described on the assumption that the weighting coefficient $\zeta(f, d, r)$ in each lens position is defined in terms of the proper distortion amount $D_{len}(f, d, r)$ in each lens position, the weighting coefficient $\zeta(f, d, r)$ in each lens position may be defined in terms of either or both of the proper distortion amount $D_{len}(f, d, r)$ and the residual aberration amount $\delta D(f, d, r)$. Some examples of the method of defining the weighting coefficient $\zeta(f, d, r)$ will be described below.

<Definition 1> The weighting coefficient $\zeta(f, d, r)$ in each lens position is defined in terms of the type of the residual aberration amount $\delta D(f, d, r)$ in each lens position (e.g. see the expression (6)).

$$\begin{cases} \zeta(f, d, r) = \text{small} & \text{when } \delta D \text{ is of a barrel type} \\ \zeta(f, d, r) = \text{moderate} & \text{when } \delta D \text{ is of a pincushion type} \\ \zeta(f, d, r) = \text{large} & \text{when } \delta D \text{ is of a mixed type} \end{cases} \quad (6)$$

<Definition 2> The weighting coefficient $\zeta(f, d, r)$ in each lens position is defined in terms of combination of the type of the proper distortion amount $D_{len}(f, d, r)$ and the type of the residual aberration amount $\delta D(f, d, r)$ in each lens position (e.g. see the expression (7)).

$$\begin{cases} \zeta(f, d, r) = \text{small} & \text{when } D_{len} \text{ is of a mixed type and} \\ & \delta D \text{ is of a unmixed type} \\ \zeta(f, d, r) = \text{large} & \text{when } D_{len} \text{ is of a barrel type and} \\ & \delta D \text{ is of a non-barrel type} \\ \zeta(f, d, r) = \text{moderate} & \text{in the other condition} \end{cases} \quad (7)$$

Incidentally, since the calculated distortion amount $D_{exp}(f, d, r)$ and the residual aberration amount $\delta D(f, d, r)$ in each lens position depend not only on the lens position but also on the set coefficients (combination of the 27 coefficients), the weighting coefficient $\zeta(f, d, r)$ should be set again whenever the coefficients are corrected in the step S14 in the case where any one of the definitions 1 and 2 is employed.

Incidentally, when the definition of the expression (6) is employed, distortion correction accuracy becomes high as the distortion amount distribution after distortion correction becomes undesired (the pincushion type rather than the barrel type, the mixed-type rather than the pincushion type).

On the other hand, when the definition of the expression (7) is employed, distortion correction which changes the distortion amount distribution from an inconspicuous distribution (barrel type) to a conspicuous distribution (non-barrel type) will have high correction accuracy, and distortion correction which changes the distortion amount distribution from a conspicuous distribution (mixed-type) to an inconspicuous distribution (non-mixed-type) will have low correction accuracy.

Although this embodiment has been described on the assumption that the weighting coefficient $\zeta(f, d, r)$ is a function of only a lens position (f, d), the weighting coefficient $\zeta(f, d, r)$ may be a function of a lens position (f, d) and an image height ratio r.

For example, when the definition of the expression (7) is employed and particularly the proper distortion amount $D_{len}(f, d, r)$ is of a barrel type and the residual aberration amount $\delta D(f, d, r)$ is of a mixed-type, a strong feeling of strangeness occurs in the periphery of the image after distortion correction. Therefore, it is effective to make the weighting coefficient $\zeta$ depend on the image height ratio r so that the value of the weighting coefficient $\zeta$ becomes large when the image height ratio r is large, as shown in FIG. 5.

Third Embodiment

A third embodiment will be described below. This embodiment is a modification of the second embodiment. Only a point of difference between this embodiment and the second embodiment will be described below.

FIG. 6 is a flow chart of optimization processing in this embodiment.

The point of difference is in that the distortion amount distribution on an image after distortion correction is brought near to an intentional distortion amount distribution instead of being brought near to zero. The intentional distortion amount distribution is hereinafter referred to as "target residual aberration amount". Information of the target residual aberration amount $D_{Target}(f, d, r)$ is input into the computer by the manufacture in advance.

In this embodiment, the 27 coefficients are optimized by the same operation as in the second embodiment (steps S11 to S15) and then the optimized coefficients are modified according to the target residual aberration amount $D_{Target}(f, d, r)$ (step S35) so that the distortion amount distribution on the image after distortion correction is brought near to the target residual aberration amount $D_{Target}(f, d, r)$.

For example, when the target residual aberration amount $D_{Target}(f, d, r)$ in all lens positions is set as a common target residual aberration amount expressed in a quadratic function of the image height ratio r (i.e. a target residual aberration amount independent of the lens position) (i.e. when $D_{Target}(f, d, r) = \alpha r^2$), only the 9 coefficients $\Lambda_{00}, \Lambda_{01}, \Lambda_{02}, \Lambda_{10}, \Lambda_{11}, \Lambda_{12}, \Lambda_{20}, \Lambda_{21}$ and $\Lambda_{22}$ concerned with $r^2$ in the 27 coefficients should be modified in the step S35, in particular, the coefficient $\Lambda_{00}$ independent of the lens position (d, f) is modified as $\Lambda_{00} \rightarrow \Lambda_{00} + \alpha$ and the like.

According to the distortion correcting information (the 27 coefficients after modification) prepared in this embodiment, the distortion amount distribution on each image can be brought near to a distortion amount distribution desired by the manufacture without any ingenuity for calculation and correction of the distortion amount (except that distortion correction is performed based on the calculating expression with the 27 coefficients into the distortion amount function (2)).

Although this embodiment is a modification of the second embodiment, the first embodiment may be modified in the same manner.

Fourth Embodiment

A fourth embodiment will be described below. This embodiment is a modification of the third embodiment. Only a point of difference between this embodiment and the third embodiment will be described below.

FIG. 7 is a flow chart of optimization processing in this embodiment.

As shown in FIG. 7, the point of difference is in that the step (step S35) of modifying the coefficients in accordance with the target residual aberration amount $D_{Target}(f, d, r)$ is omitted and the expression (8) is used in place of the expression (4) as an expression for calculation of the evaluation value S.

$$S \equiv \sum_{\text{all-position}} \int dr \{\zeta(f, d, r) |\delta D(f, d, r) - D_{Target}(f, d, r)|\} \quad (8)$$

This expression (8) is equivalent to the expression (4) coupled with the target residual aberration amount $D_{Target}(f, d, r)$. In this embodiment, the loop of the steps S12' to S14 works toward reduction of the evaluation value S given by the expression (8). Accordingly, the residual aberration amount $\delta D(f, d, r)$ approaches not zero but the target residual aberration amount $D_{Target}(f, d, r)$.

As a result, the same effect as obtained by the third embodiment can be obtained by this embodiment.

Incidentally, in this embodiment, the target residual aberration amount $D_{Target}(f, d, r)$ for each lens position may be set in accordance with the proper distortion amount $D_{len}(f, d, r)$ or its type at each lens position. If the distortion correcting information (the 27 coefficients) is obtained under such setting, the distortion amount distribution on each image after distortion correction can be controlled in accordance with the type of the distortion amount distribution on each image before distortion correction without any ingenuity for calculation and correction.

For example, in a lens position where the proper distortion amount $D_{len}(f, d, r)$ is of a mixed-type, it is desired that the target residual aberration amount $D_{Target}(f, d, r)$ is set to be of a non-mixed-type.

On the other hand, in a lens position where the proper distortion amount $D_{len}(f, d, r)$ is of a barrel type, it is desired that the target residual aberration amount $D_{Target}(f, d, r)$ is set to be of a barrel type smaller in distortion amount than the proper distortion amount $D_{len}(f, d, r)$.

In addition, in a lens position where the proper distortion amount $D_{len}(f, d, r)$ is of a pincushion type, it is desired that the target residual aberration amount $D_{Target}(f, d, r)$ is set to be of a barrel type smaller in distortion amount than the proper distortion amount $D_{len}(f, d, r)$ or of a pincushion type smaller in distortion amount than the proper distortion amount $D_{len}(f, d, r)$.

Incidentally, part or all of the setting of the target residual aberration amount $D_{Target}(f, d, r)$ may be executed automatically in the step S12' by the computer.

Moreover, the target residual aberration amount $D_{Target}(f, d, r)$ in the third embodiment may be set in the same manner as in this embodiment.

In addition, in this embodiment, an expression obtained by assignment of the weighting coefficient $\zeta(f, d, r) = 1$ into the expression (8) may be used in place of the expression (8) as an expression for calculation of the evaluation value S.

Fifth Embodiment

A fifth embodiment will be described below. This embodiment is an embodiment of image editing software having a distortion correcting function. This software is installed in a computer of a user of an electronic camera through the Internet, a CD-ROM, etc. The operation of the computer will be described for explaining the contents of this software.

When coupled to an electronic camera, the computer fetches image data stored in the electronic camera. This image data are a subject of distortion correction. As shown in FIG. 8, information expressing the type of the lens used at the shooting time and information expressing the value of the lens position (d, f) at the shooting time are added as additional information to the image data. Such additional information is added together with another information (exposure, shutter speed, shooting date and time, etc.) by the electronic camera at the shooting time.

The computer stores the aforementioned distortion amount function (2) in advance and stores distortion correcting information (sets of 27 coefficients) of a plurality of types of lenses in advance in the form of a table, for example, as shown in FIG. 9.

In this table, the distortion correcting information is stored for each type of the lens. The distortion correcting information of each lens is prepared in advance by the aforementioned embodiment. Three types of distortion correcting information, that is, information of "high" correcting intensity (distortion correcting information for high correction), information of "moderate" correcting intensity (distortion correcting information for moderate correction) and information of "low" correcting intensity (distortion correcting information for low correction), are prepared as the distortion correcting information of each lens.

The distortion correcting information for high correction is obtained in the first or second embodiment or obtained in the condition that the target residual aberration amount $D_{Target}(f, d, r)$ is set to zero, in the third or fourth embodiment.

The distortion correcting information for moderate correction is obtained in the condition that the target residual aberration amount $D_{Target}(f, d, r)$ is set to a value larger than zero, in the third or fourth embodiment.

The distortion correcting information for low correction is obtained in the condition that the target residual aberration amount $D_{Target}(f, d, r)$ is set to a value larger than zero and larger than the value for moderate correction, in the third or fourth embodiment.

For distortion correction of a certain image, the computer refers to additional information (FIG. 8) of the image and recognizes the type of the lens used for shooting the image and the values of the lens position (d, f) set at that time.

For distortion correction of the image, the computer makes a user select a mode from "high", "moderate" and "low" as correcting intensity of distortion correction to thereby decide the correcting intensity.

The computer refers to the table (FIG. 9) in accordance with the type of the used lens and the decided correcting intensity, then reads distortion correcting information (values of 27 coefficients) associated with combination of the type of the lens and the correcting intensity.

The computer assigns the read values of 27 coefficients into the aforementioned distortion amount function (2) to thereby acquire a calculating expression. In addition, the computer assigns the values of the lens position (d, f) set at the shooting time into the calculating expression so that the distortion amount distribution on the image becomes known. When an instruction to correct distortion is given by the user, the computer performs distortion correction of the image data by using the aforementioned distortion correcting information and outputs the image after distortion correction to an external monitor or the like.

As described above, since the computer in this embodiment uses distortion correcting information selectively in accordance with the correcting intensity decided by the user, it can meet the user's demand.

Moreover, since distortion correcting information of each lens in accordance with correcting intensity is prepared in the table (FIG. 9) in this embodiment, the computer can use distortion correcting information selectively in accordance with the decided correcting intensity at the time of real distortion correction without changing the contents of the arithmetic operation. Accordingly, distortion correction of each correcting intensity can be performed at a high speed.

In addition, since the distortion correcting information in this embodiment is acquired by the method described in any one of the first to fourth embodiments, distortion corrections concerned with all lens positions can be performed reliably and well respectively though the quantity of information is small.

Although three modes of distortion correcting information per one type of lens are stored in the table in this embodiment, one mode of distortion correcting information per one type of lens, two modes of distortion correcting information per one type of lens or four or more modes of distortion correcting information per one type of lens may be stored. In this case, the number of choices for user's decision becomes equal to the number of modes of distortion correcting information.

Although a plurality of modes of distortion correcting information different in correcting intensity per one type of lens are stored in the table in this embodiment, a plurality of modes of distortion correcting information different in correcting type may be stored in the table. The "plurality of modes of distortion correcting information different in correcting type" used herein means, for example, distortion correcting information obtained with the target residual aberration amount $D_{Target}(f, d, r)$ set to be of a barrel type, distortion correcting information obtained with the target residual aberration amount $D_{Target}(f, d, r)$ set to be of a pincushion type and distortion correcting information obtained with the target residual aberration amount $D_{Target}(f, d, r)$ set to be of a mixed-type, in the third or fourth embodiment. In this case, the item decided by the user is not "correcting intensity" but "correcting type".

It is desired that the contents of the table in this embodiment are updated (i.e. distortion correcting information of a new type of lens is added) whenever a new type of lens is released. It is desired that update information is published on the Internet in the same manner as various kinds of software so that the user can download it to the computer.

Although the computer is used in this embodiment, a storage, a printer or the like equipped with an image processing function may be used in place of the computer so that the same processing is performed by the storage, the printer or the like. Alternatively, the same processing may be performed by a portable device such as a camera or a camera system (a system including a camera and an interchangeable lens). Incidentally, when this processing is performed by such a camera system, it is desired that a plurality of modes of distortion correcting information are stored in the interchangeable lens in advance whereas the distortion amount function (2) is stored in the camera in advance.

Sixth Embodiment

A sixth embodiment will be described below. This embodiment is an embodiment of a lens integral type electronic camera equipped with a distortion correcting function.

FIG. 10 is a configuration diagram of this camera. As shown in FIG. 10, this camera 10 includes a lens 10L with various lens positions, a camera CPU 10A, an image sensor 12, a signal processing circuit 13, a memory 14, a companding circuit 15, a recording part 16, an image processing circuit 17, etc. Of these members, the camera CPU 10A includes an ROM, and an RAM.

Distortion correcting information (values of 27 coefficients) I concerned with the lens 10L and the distortion amount function (2) are stored in the ROM of the camera CPU 10A in advance. The manufacture of the camera 10 prepares the distortion correcting information (values of 27 coefficients) I by the method described in any one of the first to fourth embodiments. It is now assumed that the distortion correcting information I is distortion correcting information of "high" correcting intensity, for example, the one obtained with the target residual aberration amount $D_{Target}(f, d, r)$ set to zero in the third or fourth embodiment.

Incidentally, in the lens integral type camera, the type of the lens is unchanged. Accordingly, description will be made on the assumption that the distortion correcting information (values of 27 coefficients) and the distortion amount function (2) are not separately stored in the ROM of the CPU 10A but a calculating expression obtained by assignment of the former into the latter is stored in the ROM of the CPU 10A instead.

When the lens 10L forms an image of a subject on the image sensor 12 at the shooting time, the image sensor 12 acquires image data by shooting the image of the subject. After processed in the signal processing circuit 13, the image data are temporarily stored in the memory 14. The values of the lens position (f, d) of the lens 10L at the shooting time are read by the camera CPU 10A through an encoder not shown.

The camera CPU 10A assigns the values of the lens position (f, d) into the calculating expression stored in the ROM, so that the distortion amount distribution on the image becomes known. The image processing circuit 17 applies distortion correction processing to the image data stored in the memory 14 so that the distortion amount distribution after the process becomes zero (that is, the distortion amount distribution is used as correcting characteristic). The image data after distortion correction is compressed in the companding circuit 15 and then recorded in the recording part 16.

As described above, the camera 10 in this embodiment stores distortion correcting information obtained in the aforementioned embodiment as distortion correcting information in advance (in this case, the camera 10 stores a calculating expression obtained by assignment of the distortion correcting information into the distortion amount function in advance) and performs distortion correction based on it. Accordingly, distortion corrections concerned with all lens positions can be performed reliably and well respectively while the quantity of information in the distortion correcting information is reduced.

Although this embodiment has been described on the assumption that the distortion correcting information is stored in the ROM of the camera CPU 10A, the distortion correcting information may be stored in a memory provided separately from the camera CPU 10A.

Although the camera 10 in this embodiment has been described on the assumption that distortion correction is applied to the image data, essential information for distortion correction (such as information of a calculated distortion amount distribution) may be added to the image data instead of application of distortion correction. In this case, distortion correction of the image data is performed by a computer or the like.

Seventh Embodiment

A seventh embodiment will be described below. This embodiment is an embodiment of an electronic camera system having a distortion correcting function.

FIG. 11 is a configuration diagram of this camera system. As shown in FIG. 11, this camera system includes an interchangeable lens 11, and a camera 10 to which the interchangeable lens 11 can be coupled.

The interchangeable lens 11 includes a lens 11L with various lens positions, a lens CPU 11A, an ROM 11B etc. The camera 10 includes a camera CPU 10A, an image sensor 12, a signal processing circuit 13, a memory 14, a companding circuit 15, a recording part 16, an image processing circuit 17, an operation button 10B, etc. The user decides correcting intensity of distortion correction for the camera 10 through the operation button 10B. The camera CPU 10A includes an ROM, an RAM, etc. Though not shown in FIG. 11, the camera 10 is a single lens reflex camera which has an optical finder (a quick return mirror, a pentaprism, etc.) by which the user can view an image of a subject formed by the interchangeable lens 11 at a non-shooting time.

The distortion amount function (2) is stored in the ROM of the camera CPU 10A in advance whereas distortion correcting information I (values of 27 coefficients) concerned with the lens 11L is stored in the ROM 11B of the interchangeable lens 11. The manufacture of the interchangeable lens 11 prepares the distortion correcting information I by the method described in any one of the first to fourth embodiments. It is now assumed that the distortion correcting information (values of 27 coefficients) I is distortion correcting information of "high" correcting intensity, for example, the one obtained with the target residual aberration amount $D_{Target}(f, d, r)$ set to zero in the third or fourth embodiment.

At suitable timing such as powering-on time, the lens CPU 11A of the interchangeable lens 11 reads the values of 27 coefficients from the ROM 11B and transmits them to the camera CPU 10A of the camera 10.

On the other hand, when the camera CPU 10A of the camera 10 recognizes the values of 27 coefficients transmitted, the camera CPU 10A of the camera 10 assigns the values of 27 coefficients into the distortion amount function (2) stored in the ROM to acquire a calculating expression. In addition, the camera CPU 10A recognizes correcting intensity decided by the user, based on the state of the operation button 10B.

When the lens 11L forms an image of a subject on the image sensor 12 at shooting time, the image sensor 12 acquires image data by shooting the image of the subject. After processed in the signal processing circuit 13, the image data are temporarily stored in the memory 14. The values of the lens position (f, d) at the shooting time are read by the lens CPU 11A through an encoder not shown and transmitted to the camera CPU 10A of the camera 10.

The camera CPU 10A assigns the values of the lens position (f, d) into the calculating expression so that the distortion amount distribution on the image becomes known. The camera CPU 10A further converts the distortion amount distribution in accordance with correcting intensity decided by the user. When the calculated distortion amount distribution is $D(r)=A_1r^4+B_1r^3+C_1r^2$, the distortion amount distribution $D'(r)$ after conversion is, for example, expressed by the following expression (9) or (10) using a conversion coefficient $\alpha$.

$$D'(r)=A_1r^4+B_1r^3+(C_1+\alpha)r^2 \tag{9}$$

$$D'(r)=\alpha\{A_1r^4+B_1r^3+C_1r^2\} \tag{10}$$

Incidentally, for the case of (9), the conversion coefficient $\alpha$ is set to be $\alpha \to 0$ as the correcting intensity decided by the user is high. For the case of (10), the conversion coefficient $\alpha$ is set to be $\alpha \to 1$ as the correcting intensity decided by the user becomes high.

The image processing circuit 17 regards the distortion amount distribution $D'(r)$ after conversion as a distortion amount distribution on the image and applies distortion correction processing to the image data stored in the memory 14 so that the distortion amount distribution becomes zero. The image data after distortion correction is compressed in the companding circuit 15 and then recorded in the recording part 16.

As described above, in the camera system according to this embodiment, the interchangeable lens 11 stores distortion correcting information I in advance whereas the camera 10 stores the distortion amount function (2) in advance. The two kinds of information are used for calculation of the real distortion amount distribution. In addition, the camera 10 in this embodiment converts the calculated distortion amount distribution in accordance with correcting intensity decided by the user, regards the distortion amount distribution after conversion as a distortion amount distribution on the image, and performs distortion correction. Accordingly, the camera system according to this embodiment can perform distortion correction with the correcting intensity decided by the user.

Moreover, since the aforementioned distortion correcting information I is obtained in the aforementioned embodiment, distortion amount distributions concerned with all lens positions of the interchangeable lens 11 are expressed accurately though the quantity of information is small. Accordingly, distortion corrections using all correcting intensity values concerned with all lens positions can be performed respectively.

Incidentally, since the camera 10 in this embodiment is a single lens reflex camera, the image of the subject observed through the optical finder is distorted because of the influence of distortion aberration of the interchangeable lens 11. On the other hand, if distortion of the picked-up image is corrected with high correcting intensity, the distortion can be eliminated almost perfectly but there is a possibility that information on the periphery of the image may be missing. For this reason, when distortion correction is performed with high correcting intensity, there is a possibility that a large difference may be generated between the image at framing time and the picked-up image in accordance with the image. However, since the user of the camera 10 in this embodiment can decide the correcting intensity for distortion correction, the balance between correcting intensity and loss of image information can be set to a balance desired by the user.

Although this embodiment has described on the assumption that the distortion amount function (2) is stored in the ROM of the camera CPU 10A, the distortion amount function (2) may be stored in a memory provided separately from the camera CPU 10A.

Although the camera 10 in this embodiment has been described on the assumption that distortion correction is applied to the image data, essential information for distortion correction (such as information of a calculated distortion amount distribution) may be added to the image data instead of application of distortion correction. In this case, distortion correction of the image data is performed by a computer or the like.

Although this embodiment has described on the assumption that one mode of distortion correcting information is stored in the interchangeable lens 11, a plurality of modes of distortion correcting information different in correcting intensity may be stored if the storage capacity of the interchangeable lens 11 (in this case, the storage capacity of the ROM 11B) is large. In this case, the camera 10 performs calculation of the distortion amount distribution by using the three modes of distortion correcting information selectively instead of correction of the distortion amount distribution after calculation.

Eighth Embodiment

An eighth embodiment will be described below. This embodiment is a modification of the first embodiment. Only a point of difference from the first embodiment will be described below.

Although the first embodiment is based on the assumption that the values (measured values) of the lens position (f, d) measured from the lens at the time of shooting the image are accurate, there is a possibility that measurement error may occur in practice. This measurement error is caused by mechanical error of a lens driving mechanism, quantization error of an encoder, etc.

If measurement error occurs in the measured values of the lens position (f, d), calculation accuracy of the distortion amount is worsened and accordingly correction accuracy of the distortion amount is worsened even when good distortion correcting information (27 coefficients) is prepared in the first embodiment. When correction accuracy of the distortion amount is worsened, in general, the occurrence of insufficient correction is allowed but the occurrence of excessive correction is not allowed.

The computer in this embodiment therefore should modify distortion correcting information (27 coefficients) after optimization in order to surely avoid occurrence of excessive correction caused by measurement error of the lens position (f, d). This modification is hereinafter referred to as "coefficient modification" to be distinguished from distortion correction.

FIG. 12 is a flow chart of optimization processing in this embodiment. In FIG. 12, step S85 is a step of coefficient modification. The step S85 will be described below in detail.

First, the computer pays attention to a certain lens position $(f_1, d_1)$ and gives various measurement errors to estimate calculation errors at the lens position brought by the given errors. Since the target residual aberration $D_{Target}(r)$ is zero in this case, the residual distortion amount $\delta D(r)$ remaining in the image after distortion correction is estimated as calculation error (correction error).

The various measurement errors used above mean various measurement errors which may be contained in the measured values $(f_1, d_1)$ when the measured values of the lens position are $(f_1, d_1)$. These are measured from the lens (lens body tube including an encoder and a lens driving mechanism) in advance. The distortion correcting information (27 coefficients) used for estimation is distortion correcting information (27 coefficients) optimized in the previous step.

FIGS. 13A to 13D are graphs showing various residual distortion amounts $\delta D(r)$ caused by various measurement errors. Distortion amounts (proper distortion amounts $D_{len}(r)$) before distortion correction are shown in the left of FIGS. 13A to 13D. Although all proper distortion amounts $D_{len}(r)$ are drawn equally in FIG. 13 for the sake of simplification, in practice, the proper distortion amounts $D_{len}(r)$ differ little by little from one another as much as the measurement errors differ from one another.

As is obvious from comparison of FIGS. 13A to 13D, the residual distortion amount $\delta D(r)$ varies when the measurement error varies. Some measurement errors cause insufficient correction ($\delta D(r)$ and $D_{len}(r)$ have the same signs) as shown in FIGS. 13A and 13B whereas other measurement errors cause excessive correction ($\delta D(r)$ and $D_{len}(r)$ have opposite signs) as shown in FIGS. 13C and 13D.

Therefore, the computer finds out the maximum residual distortion amount $\delta D(r)$ (FIG. 13D) due to excessive correction from various residual distortion amounts $\delta D(r)$ (FIGS. 13A to 13D) caused by various measurement errors. This residual distortion amount $\delta D(r)$ is hereinafter referred to as "maximum residual distortion amount $\delta D_{max}(r)$". In this manner, the computer terminates processing in the certain lens position $(f_1, d_1)$.

The computer further performs the aforementioned processing (acquisition of the maximum residual distortion amount $\delta D_{max}(r)$) in another lens positions. As a result, all maximum residual distortion amounts $\delta D_{max}(r)$ in all lens positions are obtained.

Successively, the computer obtains an approximation function for each maximum residual distortion amount $\delta D_{max}(r)$ with respect to the two variables based on all maximum residual distortion amounts $\delta D_{max}(r)$ in all lens positions. For the approximation function, it is allowed to use the same type of function as the aforementioned distortion amount function (2), that is, the following expression (11).

$$\delta D_{max}(f, d, r) \equiv \sum_{i=0}^{2}\sum_{j=0}^{2} \delta \Gamma_{ij} d^{-i} f^{-j} r^4 + \sum_{i=0}^{2}\sum_{j=0}^{2} \delta \Delta_{ij} d^{-i} f^{-j} r^3 + \sum_{i=0}^{2}\sum_{j=0}^{2} \delta \Lambda_{ij} d^{-i} f^{-j} r^2 \quad (11)$$

However, since the expression (11) is complex, a function simplified by reduction in the number of terms of r may be employed. For example, any one of the following expressions (12A), (12B) and (12C) may be employed.

$$\delta D_{max}(f, d, r) \equiv \sum_{j=0}^{2} \delta \Gamma_{ij} d^{-i} f^{-j} r^4 \quad (12A)$$

$$\delta D_{max}(f, d, r) \equiv \sum_{j=0}^{2} \delta \Delta_{ij} d^{-i} f^{-j} r^3 \quad (12B)$$

$$\delta D_{max}(f, d, r) \equiv \sum_{j=0}^{2} \delta \Lambda_{ij} d^{-i} f^{-j} r^2 \quad (12C)$$

For the sake of simplification, the expression (12C) having only one term of $r^2$ is selected now from the expressions (12A), (12B) and (12C).

In this case, the computer fits all maximum residual distortion amounts $\delta D_{max}(r)$ at all lens positions to the expression (12C) to thereby acquire values of 9 coefficients $\delta \Lambda_{00}$, $\delta \Lambda_{01}$, $\delta \Lambda_{02}$, $\delta \Lambda_{10}$, $\delta \Lambda_{11}$, $\delta \Lambda_{12}$, $\delta \Lambda_{20}$, $\delta \Lambda_{21}$ and $\delta \Lambda_{22}$.

Successively, the computer modifies each of coefficients $\Lambda_{00}$, $\Lambda_{01}$, $\Lambda_{02}$, $\Lambda_{10}$, $\Lambda_{11}$, $\Lambda_{12}$, $\Lambda_{20}$, $\Lambda_{21}$ and $\Lambda_{22}$ in distortion correcting information (27 coefficients) optimized in the previous step by using the values of the coefficients $\delta \Lambda_{00}$, $\delta \Lambda_{01}$, $\delta \Lambda_{02}$, $\delta \Lambda_{10}$, $\delta \Lambda_{11}$, $\delta \Lambda_{12}$, $\delta \Lambda_{20}$, $\delta \Lambda_{21}$ and $\delta \Lambda_{22}$. Thus, this step is terminated.

An explicit expression used in this coefficient modification is the following expression (13).

$$\Lambda_{ij} = \Lambda_{ij} + \delta \Lambda_{ij} \quad (13)$$

Accordingly, the distortion correcting information (27 coefficients) after coefficient modification has no possibility to make an image with excessive correction. Even if there is calculation error brought by the distortion correcting information (27 coefficients) b, it would behave as insufficient correction any way.

In coefficient modification in this embodiment, even when a result with insufficient correction is caused by the distortion correcting information (27 coefficients), the residual distortion amount on the image would be approximately proportional to $r^2$ because a subject of the coefficient modification is limited to only the coefficients (9 coefficients) concerned with $r^2$ in the distortion correcting information (27 coefficients).

Hence, according to the distortion correcting information (27 coefficients) obtained in this embodiment, the possibility that unnatural distortion will remain in the image after distortion correction is reduced surely.

Although this embodiment is a modification of the first embodiment, any one of the second embodiment, the third embodiment and the fourth embodiment may be modified in the same manner. In addition, coefficients (distortion correcting information) prepared in any one of these modifications may be used in any one of the fifth to seventh embodiments.

Other Embodiments

Although the aforementioned embodiments have been described on the case where the coefficients A, B and C in the distortion amount distribution (expression (1)) are expressed in coefficient functions (A), (B) and (C) in order to reduce the quantity of information in the distortion correcting information as sufficiently as possible, values of the coefficients A, B and C in all lens positions may be directly prepared as distortion correcting information if it is unnecessary to reduce the quantity of information. The distortion correcting information may be distortion correcting information for setting the distortion amount distribution in each lens position after correction to zero or may be distortion correcting information for setting the distortion amount distribution in each lens position after correction to the target residual aberration amount $D_{Target}(f, d, r)$.

Although the aforementioned embodiments have been described on the case where the coefficient functions (A), (B) and (C) are formed from terms of inverse power of f and terms of inverse power of d, the functions for coefficients (A), (B) and (C) may contain terms of multiple root of f (such as $f^{1/2} = \sqrt{f}$) and terms of positive power of f (such as f and $f^2$). Some examples of the coefficient functions will be described below.

$$A(f, d) \equiv \sum_{i=0}^{2}\sum_{j=0}^{2} \Gamma_{ij}\left(\frac{1}{f}\right)^i\left(\frac{1}{d}\right)^j + \sum_{j=0}^{2} \Gamma_{3j}\sqrt{\frac{1}{f}}\left(\frac{1}{d}\right)^j \quad (A1)$$

$$B(f, d) \equiv \sum_{i=0}^{2}\sum_{j=0}^{2} \Delta_{ij}\left(\frac{1}{f}\right)^i\left(\frac{1}{d}\right)^j + \sum_{j=0}^{2} \Delta_{3j}\sqrt{\frac{1}{f}}\left(\frac{1}{d}\right)^j \quad (B1)$$

$$C(f, d) \equiv \sum_{i=0}^{2}\sum_{j=0}^{2} \Lambda_{ij}\left(\frac{1}{f}\right)^i\left(\frac{1}{d}\right)^j + \sum_{j=0}^{2} \Lambda_{3j}\sqrt{\frac{1}{f}}\left(\frac{1}{d}\right)^j \quad (C1)$$

$$A(f, d) \equiv \sum_{i=0}^{2}\sum_{j=0}^{2} \Gamma_{ij}\left(\frac{f_c}{f}\right)^i\left(\frac{d_c}{d}\right)^j + \sum_{j=0}^{2} \Gamma_{3j}\sqrt{\frac{f_c}{f}}\left(\frac{d_c}{d}\right)^j \quad (A2)$$

$$B(f, d) \equiv \sum_{i=0}^{2}\sum_{j=0}^{2} \Delta_{ij}\left(\frac{f_c}{f}\right)^i\left(\frac{d_c}{d}\right)^j + \sum_{j=0}^{2} \Delta_{3j}\sqrt{\frac{f_c}{f}}\left(\frac{d_c}{d}\right)^j \quad (B2)$$

$$C(f, d) \equiv \sum_{i=0}^{2}\sum_{j=0}^{2} \Lambda_{ij}\left(\frac{f_c}{f}\right)^i\left(\frac{d_c}{d}\right)^j + \sum_{j=0}^{2} \Lambda_{3j}\sqrt{\frac{f_c}{f}}\left(\frac{d_c}{d}\right)^j \quad (C2)$$

Incidentally, $f_c$ is a representative value of the focal length f, and $d_c$ is a representative value of the focal position d. For example, $f_c$ is the minimum value in a value range of the focal length f for a lens to be subjected to distortion correction, and $d_c$ is the minimum value in a value range of the focal position d for the lens.

$$A(f, d) \equiv \sum_{i=0,-1,-2}\sum_{j=0,\frac{1}{2},1,2} \Gamma_{ij} d^i f^j \quad (A3)$$

$$B(f, d) \equiv \sum_{i=0,-1,-2}\sum_{j=0,\frac{1}{2},1,2} \Delta_{ij} d^i f^j \quad (B3)$$

$$C(f, d) \equiv \sum_{i=0,-1,-2}\sum_{j=0,\frac{1}{2},1,2} \Lambda_{ij} d^i f^j \quad (C3)$$

$$A(f, d) \equiv \sum_{i=0,-1,-2}\sum_{j=-1,0,1} \Gamma_{ij} d^i f^j \quad (A4)$$

$$B(f, d) \equiv \sum_{i=0,-1,-2}\sum_{j=-1,0,1} \Delta_{ij} d^i f^j \quad (B4)$$

$$C(f, d) \equiv \sum_{i=0,-1,-2}\sum_{j=-1,0,1} \Lambda_{ij} d^i f^j \quad (C4)$$

Although the aforementioned embodiments have been described on the case where the expression (1) is used as an expression of the distortion amount distribution, another expression may be used, for example, as represented by the following expression (14) or (15).

$$D(r)=Ar^3+Br^2 \quad (14)$$

$$D(r)=Ar^3+Br^2+Cr \quad (15)$$

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A distortion correcting method, comprising:
   a preparing operation which expresses distortion aberration of an optical system for shooting in a function of a lens position thereof, optimizes coefficients of said function so that residual aberrations in two or more lens positions are controlled appropriately respectively, and prepares, in advance, information of optimized coefficients thereof as distortion correcting information of said optical system; and
   a correcting operation which performs a correction of distortion of an image picked up by said optical system based on the lens position at shooting time and said distortion correcting information prepared.

2. The distortion correcting method according to claim 1, wherein the optimization of said coefficients performs control of a balance between amounts of the residual aberrations in said two or more lens positions.

3. The distortion correcting method according to claim 2, wherein the amounts of residual aberrations in said two or more lens positions are set according to aberration types before said correction in said two or more lens positions.

4. The distortion correcting method according to claim 2, wherein the amounts of residual aberrations in said two or more lens positions are set according to types of the residual aberrations in said two or more lens positions.

5. The distortion correcting method according to claim 2, wherein the amounts of residual aberrations in said two or more lens positions are set for each of image heights in said two or more lens positions.

6. The distortion correcting method according to claim 1, wherein said preparing operation modifies said optimized coefficients so that the residual aberrations in said two or more lens positions are set to target residual aberrations.

7. The distortion correcting method according to claim 1, wherein the optimization of said coefficients performs control so that the residual aberrations in said two or more lens positions approach target residual aberrations.

8. The distortion correcting method according to claim 6, wherein the target residual aberrations in said two or more lens positions are set according to the aberrations before said correction in said two or more lens positions.

9. The distortion correcting method according to claim 8, wherein the target residual aberration in a lens position where the aberration type before said correction is a mixed-type is set to be of a non-mixed-type, the mixed-type being a mixture of barrel and pincushion types.

10. The distortion correcting method according to claim 8, wherein the target residual aberration in a lens position where the aberration type before said correction is a barrel type is set to be of a barrel type smaller in distortion amount than before said correction.

11. The distortion correcting method according to claim 8, wherein the target residual aberration in a lens position where the aberration type before said correction is a pincushion type is set to be of one of a barrel type smaller in distortion amount than before said correction and a pincushion type smaller in distortion amount than before said correction.

12. The distortion correcting method according to claim 1, wherein said preparing operation estimates the possibility that error will be contained in values of said lens position used for said distortion correction.

13. The distortion correcting method according to claim 12, wherein said preparing operation modifies said optimized coefficients so that said correction can be prevented from excessive correction even when error is contained in values of said lens position used for said distortion correction.

14. A non-transitory computer-readable carrier medium carrying a distortion correcting program causing a computer to execute:
   a preparing operation which expresses distortion aberration of an optical system for shooting in a function of a lens position thereof, optimizes coefficients of said function so that residual aberrations in two or more lens positions are controlled appropriately respectively, and prepares, in advance, information of optimized coefficients thereof as distortion correcting information of said optical system; and
   a correcting operation which performs a correction of distortion of an image picked up by said optical system based on the lens position at shooting time and said distortion correcting information prepared.

15. The non-transitory computer-readable carrier medium carrying the distortion correcting program according to claim 14, wherein said coefficients are optimized in advance so that the amounts of residual aberrations in said two or more lens positions depend on aberration types before said correction in said two or more lens positions.

16. The non-transitory computer-readable carrier medium carrying the distortion correcting program according to claim 14, wherein said coefficients are optimized in advance so that the amounts of residual aberrations in said two or more lens positions depend on residual aberration types in said two or more lens positions.

17. The non-transitory computer-readable carrier medium carrying the distortion correcting program according to claim 14, wherein said coefficients are optimized in advance so that the amounts of residual aberrations in said two or more lens positions depend on image heights in said two or more lens positions.

18. The non-transitory computer-readable carrier medium carrying the distortion correcting program according to claim 14, wherein said coefficients are optimized in advance so that the residual aberrations in said two or more lens positions approach target residual aberrations.

19. The non-transitory computer-readable carrier medium carrying the distortion correcting program according to claim 18, wherein the target residual aberrations in said two or more lens positions depend on aberrations before said correction in said two or more lens positions.

20. The non-transitory computer-readable carrier medium carrying the distortion correcting program according to claim 19, wherein the target residual aberration in a lens position where the aberration type before said correction is a mixed-type is of a non-mixed-type, the mixed-type being a mixture of barrel and pincushion types.

21. The non-transitory computer-readable carrier medium carrying the distortion correcting program according to claim 19, wherein the target residual aberration in a lens position where the aberration type before said correction is a barrel type is of a barrel type smaller in distortion amount than before said correction.

22. The non-transitory computer-readable carrier medium carrying the distortion correcting program according to claim 19, wherein the target residual aberration in a lens position where the aberration type before said correction is a pincushion type is of one of a barrel type smaller in distortion amount than before said correction and a pincushion type smaller in distortion amount than before said correction.

23. The non-transitory computer-readable carrier medium carrying the distortion correcting program according to claim 14, wherein said coefficients are optimized in advance so that the correction can be prevented from excessive correction even when error is contained in values of said lens position used for said distortion correction.

24. An optical apparatus comprising an optical system for shooting, and a memory storing in advance, information of coefficients when distortion aberration of said optical system is expressed in a function of lens position of said optical system as distortion correcting information to be used when a correction of distortion of an image picked up by said optical system will be performed, the information of coefficients being optimized in advance so that balance between amounts of residual aberrations in two or more lens positions is controlled.

25. The optical apparatus according to claim 24, wherein said coefficients are optimized in advance so that the amounts of residual aberrations in said two or more lens positions depend on aberration types before said correction in said two or more lens positions.

26. The optical apparatus according to claim 24, wherein said coefficients are optimized in advance so that the amounts of residual aberrations in said two or more lens positions depend on residual aberration types in said two or more lens positions.

27. The optical apparatus according to claim 24, wherein said coefficients are optimized in advance so that the amounts of residual aberrations in said two or more lens positions depend on image heights in said two or more lens positions.

28. The optical apparatus according to claim 24, wherein said coefficients are optimized in advance so that the residual aberrations in said two or more lens positions approach target residual aberrations.

29. The optical apparatus according to claim 28, wherein the target residual aberrations in said two or more lens positions depend on aberrations before said correction in said two or more lens positions.

30. The optical apparatus according to claim 29, wherein the target residual aberration in a lens position where the aberration type before said correction is a mixed-type is of a non-mixed-type, the mixed-type being a mixture of barrel and pincushion types.

31. The optical apparatus according to claim 29, wherein the target residual aberration in a lens position where the aberration type before said correction is a barrel type is of a barrel type smaller in distortion amount than before said correction.

32. The optical apparatus according to claim 29, wherein the target residual aberration in a lens position where the aberration type before said correction is a pincushion type is of one of a barrel type smaller in distortion amount than before said correction and a pincushion type smaller in distortion amount than before said correction.

33. The optical apparatus according to claim 24, wherein said coefficients are optimized in advance so that the correction can be prevented from excessive correction even when error is contained in values of said lens position used together with said coefficients for said distortion correction.

34. A camera system comprising:
the optical apparatus according to claim 24 in the form of an interchangeable lens which has said optical system for shooting and said memory in which said distortion correcting information is stored in advance; and
a camera which can be coupled to said interchangeable lens and which can read said distortion correcting information stored in advance in said interchangeable lens.

* * * * *